United States Patent
Wentink

(10) Patent No.: US 8,824,378 B2
(45) Date of Patent: Sep. 2, 2014

(54) UNSCHEDULED PEER POWER SAVE MODE

(76) Inventor: Maarten Menzo Wentink, Naarden (NL)

( * ) Notice: Subject to any disclaimer, the term of this patent is extended or adjusted under 35 U.S.C. 154(b) by 693 days.

(21) Appl. No.: 12/363,031

(22) Filed: Jan. 30, 2009

(65) Prior Publication Data

US 2009/0196211 A1 Aug. 6, 2009

Related U.S. Application Data

(60) Provisional application No. 61/025,415, filed on Feb. 1, 2008, provisional application No. 61/025,417, filed on Feb. 1, 2008.

(51) Int. Cl.
*H04W 4/00* (2009.01)
*H04W 52/02* (2009.01)

(52) U.S. Cl.
CPC ............ *H04W 52/0235* (2013.01); *Y02B 60/50* (2013.01)
USPC ............................ 370/329; 370/465; 455/522

(58) Field of Classification Search
None
See application file for complete search history.

(56) References Cited

U.S. PATENT DOCUMENTS

| | | | |
|---|---|---|---|
| 2003/0231608 A1* | 12/2003 | Wentink | 370/338 |
| 2004/0125777 A1* | 7/2004 | Doyle et al. | 370/338 |
| 2005/0025167 A1* | 2/2005 | Ishibashi et al. | 370/412 |
| 2006/0285517 A1* | 12/2006 | Kakani | 370/329 |
| 2008/0186901 A1* | 8/2008 | Itagaki et al. | 370/315 |
| 2008/0219228 A1* | 9/2008 | Seok et al. | 370/338 |
| 2009/0196212 A1 | 8/2009 | Wentink | |

OTHER PUBLICATIONS

Safonov, Alexander, "Normative Text for Peer Power Save Mode," IEEE P 802-08/0071r2, Mar. 2008, located at website: https://mentor.ieee.org/802.11/dcn/08/11-08-0071-02-000z-normative-text-for-peer-power-save-mode.doc, (7 Pages).

Safonov, Alexander, "Normative Text for peer Power Save Mode," IEEE 802.11-08/0071r2, Jan. 2008, located at website: https://mentor.ieee.org/802.11/dcn/08/11-08-0071-01-000z-normative-text-for-peer-power-save-mode.doc, (10 pages).

Seok, Yongho, et al., "Normative Text for Peer Power Save Mode," IEEE 802.11-08/0071r1, Jan. 2008, located at website: https://mentor.ieee.org/802.11/dcn/08/11-08-0071-00-000z-normative-text-for-peer-power-save-mode.doc, (8 pages).

Sofonov, Alexander, Presentation entitled:"Peer Power Save Mode," IEEE 802.11-08/0070r1, Mar. 17, 2008, located at website: https://mentor.ieee.org/802.11/dcn/08/11-08-0070-01-000z-peer-power-save-mode.ppt, (7 Pages).

Sofonov, Alexander, Presentation entitled:"Direct Transmission in PSM," IEEE 802.11-07/2760r2, Nov. 13, 2007, located at website: https://mentor.ieee.org/802.11/dcn/07/11-07-2760-02-000z-direct-transmission-in-psm.ppt, (13 Pages).

* cited by examiner

*Primary Examiner* — Jianye Wu
(74) *Attorney, Agent, or Firm* — McClure, Qualey & Rodack, LLP

(57) ABSTRACT

Embodiments of unscheduled peer power save systems, devices and methods are disclosed. For example, a method of saving power for nodes configured to communicate via a direct link is provided. In one embodiment, among others, the method comprises forming, at an access point node (AP node), a indication frame for a client node, when no service period has occurred for the client node for a period of time at least equal to an indication window; sending the formed indication frame from the AP node to the client node through an access point; receiving, at the client node, the peer traffic indication from the access point; and determining, at the client node, that the AP node has traffic to send to the client node based on the indication frame.

19 Claims, 14 Drawing Sheets

UNSCHEDULED PEER POWER SAVE MODE

CROSS-REFERENCE TO RELATED APPLICATIONS

This application claims priority to copending U.S. Provisional Application having Ser. No. 61/025,417, filed on Feb. 1, 2008, which is incorporated herein by reference in its entirety, and copending U.S. Provisional Application having Ser. No. 61/025,415, also filed on Feb. 1, 2008, which is also incorporated herein by reference in its entirety.

Also, this application is related to copending U.S. utility application entitled, "Scheduled Peer Power Save Mode," having Ser. No. 12/363,740, filed Jan. 31, 2009, which is incorporated herein by reference in its entirety and which also claims priority to the above-referenced U.S. Provisional Applications.

TECHNICAL FIELD

The present disclosure is generally related to communication systems, and, more particularly, is related to wireless communication systems and methods.

BACKGROUND

Wireless communication systems are widely deployed to provide various types of wireless communication, such as voice, data, and so on, between various devices (also referred to as stations) such as cell phones, laptop computers, cameras, servers, desktop computers, etc. IEEE 802.11 is a set of standards for wireless local area network (WLAN) communication between the devices, which is also sometimes referred to as wireless fidelity (WiFi). The devices fall into one of two categories: access points and clients. An access point, normally a router, is a base station for the wireless network that is connected to a wired network infrastructure. Clients are typically end devices, which are referred to as stations.

Wireless communication has provided users with the ability to communicate with wireless devices without the constraints of a wired connection. To further facilitate mobility, many wireless devices, such as cell phones, laptop computers, cameras, etc., also utilize mobile power sources, such as batteries. As many of these wireless devices utilize battery power, conserving power to extend battery life has emerged as a priority.

SUMMARY

Embodiments of unscheduled peer power save systems, devices and methods are disclosed. For example, a method of saving power for nodes configured to communicate via a direct link is provided. In one embodiment, among others, the method comprises forming, at an access point node (AP node), an indication frame for a client node, when no service period has occurred for the client node for a period of time at least equal to an indication window; sending the formed indication frame from the AP node to the client node through an access point, receiving, at the client node, the indication frame from the access point; and determining, at the client node, that the AP node has traffic to send to the client node based on the indication frame.

Other systems, methods, features, and advantages of the present disclosure will be or become apparent to one with skill in the art upon examination of the following drawings and detailed description. It is intended that all such additional systems, methods, features, and advantages be included within this description, and be within the scope of the present disclosure.

BRIEF DESCRIPTION OF THE DRAWINGS

Many aspects of the disclosed systems and methods can be better understood with reference to the following drawings. The components in the drawings are not necessarily to scale, emphasis instead being placed upon clearly illustrating the principles of the disclosed systems and methods. Moreover, in the drawings, reference numerals designate corresponding parts throughout the several views.

DETAILED DESCRIPTION

Disclosed herein are various embodiments of unscheduled peer power save mode (PSM) systems and methods wherein the battery life of a wireless device can be improved for at least the reason that the wake time is reduced when compared to conventional techniques, among other advantages. In unscheduled peer PSM, a station and a peer station are configured to communicate over a direct link. A direct link is a connection directly between two stations which are associated with the same access point. The direct link enables peer to peer communication between the two stations.

The stations may be in a low power state (e.g., a doze state) to conserve power when no data traffic is being transmitted between them. Depending on whether the stations have traffic to send to each other, the station and the peer station can start unscheduled service periods during which data traffic is sent between the stations over the direct link. Specifically, when a station has traffic to send to the peer station, and no service period has occurred during an indication window, the station can notify the peer station by sending an indication frame to the peer station through the access point. The indication frame indicates the non-empty access categories (ACs) at the station. The peer station receives the indication frame and determines that the peer station should enter a more fully powered state (e.g., an awake state) and begin communicating with the station over the direct link. Hence, in unscheduled peer PSM, a station may be able to indicate to a peer station the presence of buffered traffic instead of relying on the access point to perform this function. Further, in unscheduled peer PSM, both stations may be able to be in a power save mode at the same time.

Such unscheduled peer PSM systems and methods are described below in the context of IEEE 802.11 compliant communication systems, though the principles described herein can be extended to other communication systems and protocols and hence are not so limited. This description is written with reference to public documents IEEE Draft P802.11z_D0.1.doc, IEEE document IEEE802.11-2007.pdf (IEEE Std 802.11™-2007) and Wi-Fi Alliance (WFA) document WMM_Specification_1-1.doc (WMM™ (including WMM™ Power Save) Specification version 1.1), which are all hereby incorporated by reference in their entirety.

Figure 1:
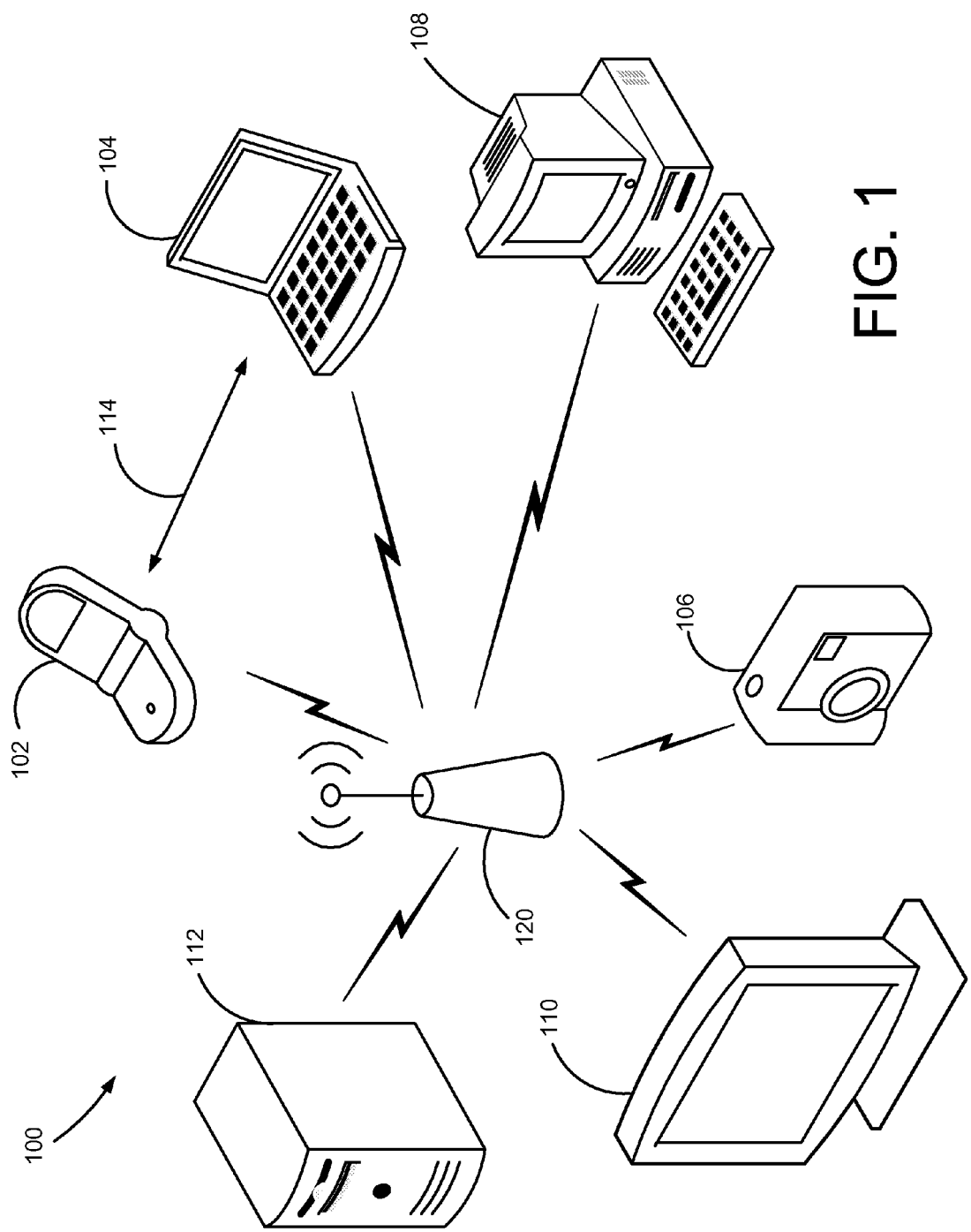
FIG. 1 is a block diagram of an exemplary communication environment in which embodiments of unscheduled peer power save mode (peer PSM) systems and methods can be implemented.

FIG. 1 is a block diagram of an exemplary communication environment 100 in which embodiments of unscheduled peer PSM can be implemented. The communication environment 100 comprises a plurality of wireless and wired devices (or appliances), one or more of which may be configured to operate as a wireless and wired device. One or more of the devices shown in FIG. 1 may incorporate unscheduled peer PSM systems and methods, as described further below. Exemplary wireless devices include a cell phone 102, a laptop computer 104 (which, along with other devices, may communicate with the cell phone 102 in a direct link mechanism as represented by direct link 114), and a digital camera 106. The wired devices (e.g., with wireless capability) include a personal computer (PC) 108, a television 110, and a server 112. In the communication environment 100 shown in FIG. 1, the cell phone 102 is in communication (e.g., radio frequency communication) with the laptop computer 104 and the PC 108 via an access point 120, and the server 112 is communication with the television 110 via the access point 120. Also, the digital camera 106 is in communication with the laptop computer 104 and the PC 108 via the access point 120. For instance, such communications may be used to load pictures from the digital camera 106 to the PC 108. For illustrative purposes, the cell phone 102 is shown as an appliance that embodies an embodiment of the unscheduled peer PSM device 200, illustrated in FIG. 2, as a client node, and the laptop computer 104 is shown as an appliance that embodies an embodiment of the unscheduled peer PSM device 200 as an AP node. Wireless direct links 114 may be instantiated between any of the devices shown in FIG. 1.

Note that communication between the various devices may employ one or more of a plurality of protocols, including IEEE 802.11 (e.g., 802.1 la, 802.11b, 802.11e, 802.11g, 802.11n, 802.11z), WiMax, Ultra-Wide Band (UWB), Bluetooth, among other technologies. Additionally, although the communication environment 100 is shown as a basic service set (BSS) configuration, in some embodiments, communication among one or more devices may be implemented using peer-to-peer networking, adhoc networking, which is also referred to as independent basic service set (IBSS), and mesh networking (for instance as standardized in 802.11s), in lieu of or in addition to communication through the access point 120. In FIG. 1, the cell phone 102 and laptop computer 104 can communicate peer-to-peer over the direct link 114.

Figure 2:
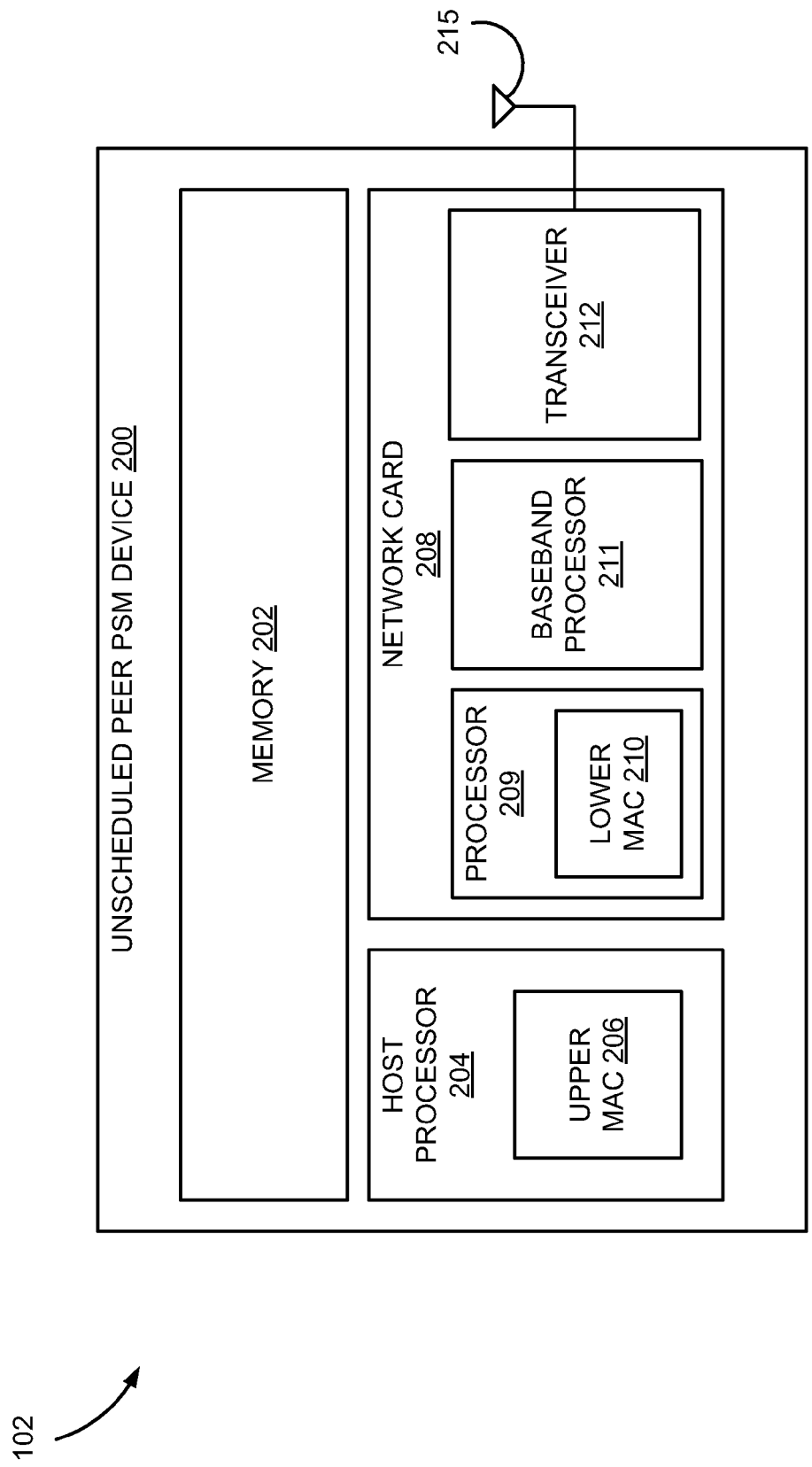
FIG. 2 is a block diagram that illustrates an embodiment of an unscheduled peer PSM system embodied in one of the devices shown in FIG. 1.

FIG. 2 is a block diagram that illustrates an embodiment of an unscheduled peer PSM device 200 implemented in the cell phone 102 shown in FIG. 1, with the understanding that other devices may embody the unscheduled peer PSM device 200 in addition to, or in lieu of, the cell phone 102. Note that the devices shown in FIGS. 1 and 2 are exemplary in nature, and that the unscheduled peer PSM device 200 may be implemented in any one of a plurality of different devices or appliances, including computers (desktop, portable, laptop, etc.), consumer electronic devices (e.g., multi-media players, music players, portable sound recording devices, digital radio devices), cell phones, smart phones, compatible telecommunication devices, personal digital assistants (PDAs), global positioning system (GPS) navigation systems, or any other type of network devices, such as printers, fax machines, scanners, hubs, switches, routers, set-top boxes, video game consoles, receivers, webcams, digital cameras, digital camcorders, televisions with communication capability, projectors, video servers, network attached storage (NAS) drives, roadside communication systems, robots, or any one of a variety of other network devices. Unscheduled peer PSM may be applied inside a house, a living room, an office, on a street, in a yard, a car, between a car and a roadside system, or in any one of a variety of other environments.

The unscheduled peer PSM device 200 can be implemented using digital circuitry, analog circuitry, or a combination of both, and is embodied in one embodiment using a combination of hardware and software. As to hardware, one or more components of the unscheduled peer PSM device 200 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), or one of a variety of other technologies for implementing logic.

In one embodiment, the unscheduled peer PSM device 200 comprises a memory 202, a host processor (or media access controller in some embodiments) 204 executing code (e.g., a driver) referred to also as an upper MAC 206, and a network card 208 (e.g., network interface card or wireless card) coupled to the host processor 204, the network card 208 comprising a processor or media access controller 209 executing code referred to as a lower MAC 210, a baseband processor 211 coupled to the processor 209, a transceiver 212 coupled to the baseband processor 211, and an antenna 215 coupled to the transceiver 212. Note that the above-described components of the unscheduled peer PSM device 200 are also collectively referred to as a station or a node. In some embodiments, a station or a node may comprise fewer, additional or different components.

Further, in some embodiments, the lower MAC 210 can be incorporated into the baseband processor 211. The transceiver 212 comprises in one embodiment such well-known transceiver components including filters, amplifiers (e.g., power amplifiers, switches, etc.). The host processor 204 and processor (or media access controller) 209 may each be embodied as a digital signal processor (DSP), a microprocessor, a general purpose processor, or an application specific integrated circuit (ASIC), among others devices. One having ordinary skill in the art should appreciate that additional components not shown can be used (e.g., a host processor interface, various busses, etc.), yet which are omitted for brevity.

In one embodiment, preparation, transmission, and reception of frames, as well as the determination of signal strength, is under the control of the lower MAC 210 as executed by the processor 209. In some embodiments, control of the aforementioned functionality is solely by either the upper MAC 206 or the lower MAC 210, and in some embodiments, the execution of the MACs 206 and 210 may be implemented via a single processor or on two or more processors. In some embodiments, functionality of the upper and lower MACs 206 and 210 may be collectively performed in a single MAC.

In one embodiment, the upper MAC 206 and lower MAC 210 each comprise software (e.g., firmware) residing on the respective processors 204 and 209, respectively, that is executed by a suitable instruction execution system. In some embodiments, functionality of the upper MAC 206 and lower MAC 210 may comprise software stored in memory (e.g., memory 202) or other computer readable medium (e.g., optical, magnetic, semiconductor, etc.), and executed by the host processor 204 or other processor.

Figure 3:
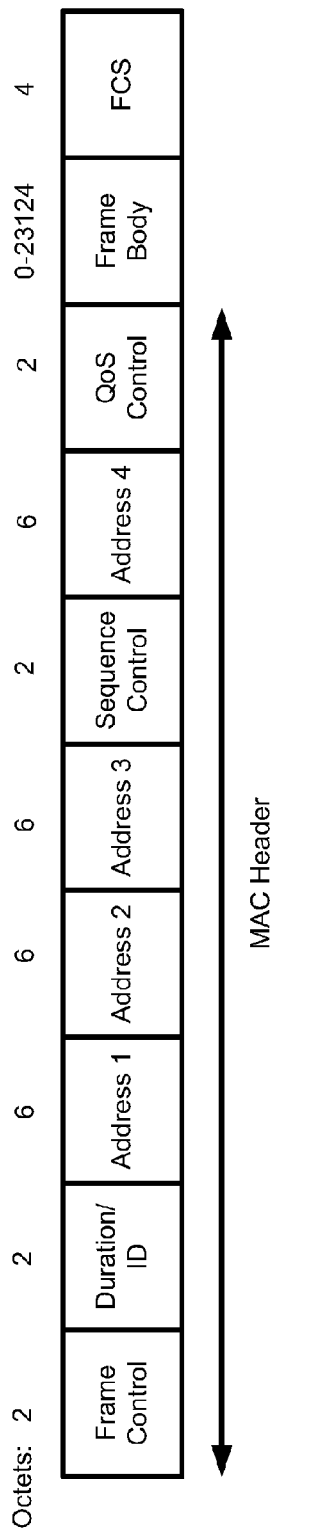
FIG. 3 is a schematic diagram of a general media access control (MAC) frame format defined in IEEE 802.11.

Wireless LANs are generally implemented according to the standard defined by the ISO/IEC 8802-11 international standard (IEEE 802.11) for wireless systems operating in the 2.4-2.5 GHz ISM (industrial, scientific and medical) band, which is also referred to as IEEE Std 802.11™-2007. FIG. 3 illustrates a general MAC frame format defined in IEEE 802.11. Each MAC frame includes a MAC header, a variable length frame body and a frame check sequence (FCS). As shown, the MAC header includes Frame Control, Duration/ID, Address 1, Address 2, Address 3, Sequence Control, Address 4 and quality of service (QoS) control fields. The FCS is appended after the frame body. The address fields in MAC frame format are used to indicate the Basic Service Set identifier (BSSID), Source address (SA), Destination Address (DA), Transmitter Address (TA), and Receiver Address (RA), depending on the direction of the frame (station to station, station to access point, access point to station, or access point to access point, respectively). Thus, when receiving data frames transmitted in the wireless LANs, a station operating in a service set can detect the packets transmitted over a wireless media (WM) and determine the intended recipient in accordance with the destination information therein. A station waiting for data frames needs to be powered in order to receive packets transmitted to the station.

However, since most stations in the wireless network are mobile devices which may be battery powered, power management becomes an important consideration in performance analysis. IEEE 802.11 provides a mechanism to support establishment and maintenance of the power management mode of a station, wherein a station may be in one of two different power states: awake and doze. The station in the awake state is fully powered, while the station in the doze state is not able to transmit or receive and consumes very low power. A station in power save mode may enter the doze state, depending on the specific power save mode.

Also, Unscheduled Asynchronous Power Save Delivery (U-APSD) is a mechanism for IEEE 802.11-based systems that was developed to help wireless devices conserve power. According to U-APSD, the station sends a trigger frame to the access point when the access point has indicated that it has buffered traffic for the station. The trigger frame is then acknowledged by the access point. The station remains awake after sending the trigger frame. At some time after receiving the trigger frame, the access point responds by sending buffered downlink traffic (e.g., data frames) to the station. On the final transmitted downlink frame, the access point may set an End Of Service Period (EOSP) bit, which indicates to the station that the service period has ended and that the station can return to a doze state, where at least one of the active components utilized during normal operation is deactivated during a period of communicative inactivity. Also, the access point may set the EOSP bit to terminate the service period when the access point has more data buffered for the station. In U-APSD, the station may also send a trigger frame to the access point without first receiving an indication from the access point that traffic is buffered.

Unscheduled peer PSM is a power save mode that can be used by a station and a peer station that support Tunneled Direct Link Setup (TDLS) (IEEE 802.11z). TDLS is characterized by the fact that the signaling frames are encapsulated in data frames, which allows them to be transmitted through an access point transparently. Therefore, a direct link can be setup using any access point. The access point does not need to be direct link aware, nor does it have to support any of the capabilities that will be used on the direct link. TLDS also includes an option to enter unscheduled peer PSM while remaining on the direct link, so that the station can enter a power save mode while the direct link remains logically in place.

Stations capable of supporting unscheduled peer PSM may signal this capability in the Extended Capabilities Information Element in the frame body of a management frame like a beacon frame or an association request frame. Section 7.3.2.27 of IEEE document IEEE802.11-2007.pdf describes the Extended Capabilities Information Element in further detail. Table 1 describes the manner in which a station signals whether the station is capable of supporting unscheduled peer PSM.

TABLE 1

Extended Capabilities Information Fields

| Bit | Information | Notes |
|---|---|---|
| <ANA> | Peer PSM AP mode | The Peer PSM AP mode capability bit set to 1 indicates that the station supports Peer PSM AP mode. The Peer PSM AP mode capability bit set to 0 indicates that the station does not support this capability. |
| <ANA> | Peer PSM client mode | The Peer PSM client mode capability bit set to 1 indicates that the station supports Peer PSM client mode. The Peer PSM client mode capability bit set to 0 indicates that the station does not support this capability. |

FIGS. 5-16 are flow charts illustrating various methods of saving power for stations configured to communicate via a direct link. One or more of the methods is executable by the devices illustrated in the communication environment 100 depicted in FIG. 1. For example, the cell phone 102, the laptop computer 104, and the access point 120 of FIG. 1 may embody the client node, the AP node, and the access point, respectively, described below in the following embodiments. Further, in some embodiments, the unscheduled peer PSM device 200 described above with respect to FIG. 2 may be configured as the client node or the AP node. In other words, in some embodiments, the client node and the AP node store modules, segments, or portions of code including one or more executable instructions for execution by a processor to implement specific logical functions or blocks of the embodiments of the methods described below. Also, the AP node is not an access point but rather a station in an access point mode with respect to U-APSD. Further, the client node is a station in client mode with respect to U-APSD.

Figure 5:
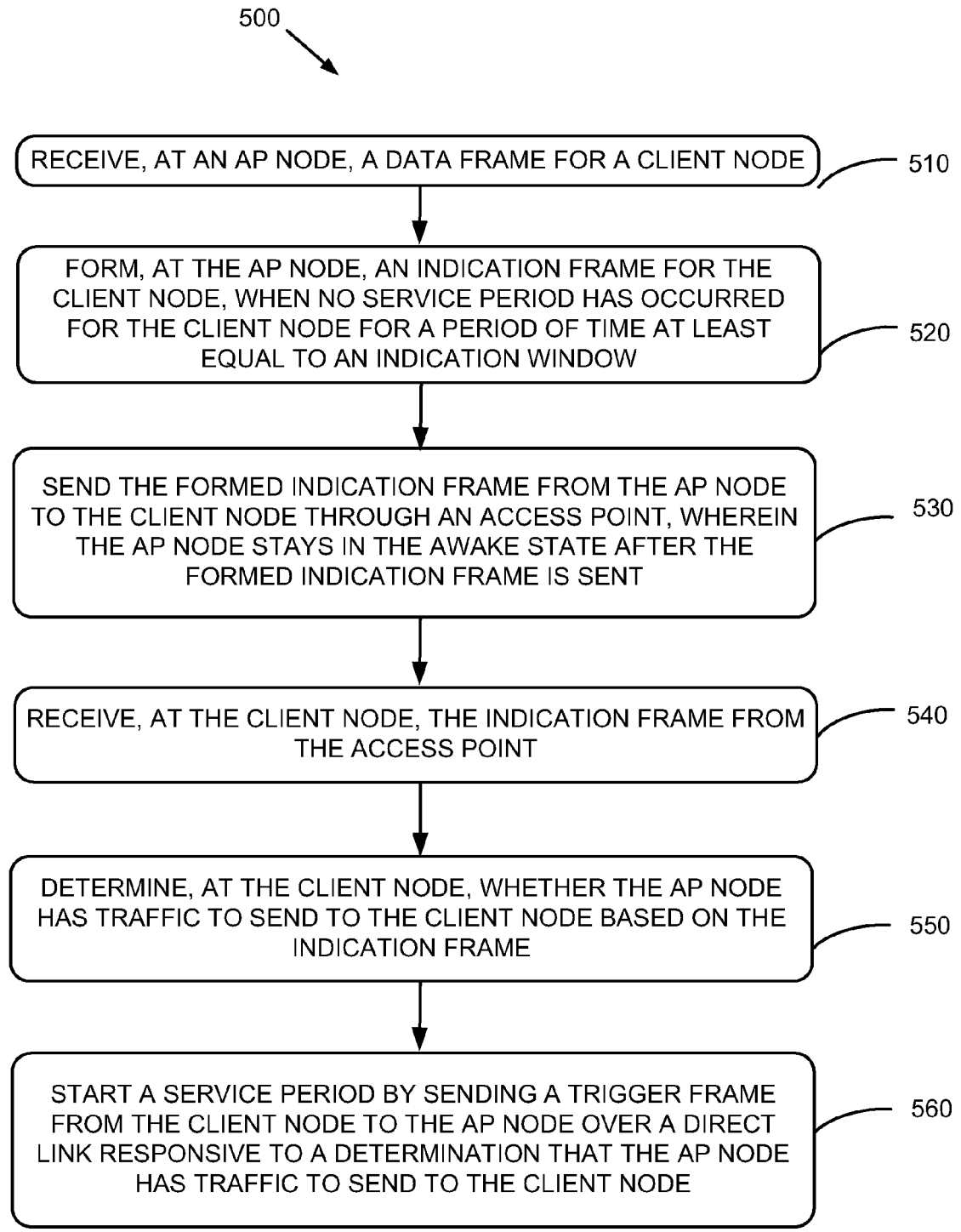
FIGS. 5-16 are flow charts that illustrate several embodiments of methods executed by the unscheduled peer PSM system shown in FIGS. 1 and 2.

FIG. 5 is a flow chart that illustrates a first embodiment of a method of saving power for stations configured to communicate via a direct link. In FIG. 5, the method 500 includes blocks 510, 520, 530, 540, 550, and 560. In block 510, a data frame for the client node is received at an AP node. The AP node and the client node are associated with the same access point. The AP node and the client node are stations that are direct link peers, and the AP node is in an access point mode whereas the client node is in a client mode with respect to U-APSD. Further, in block 510, the client node may be in a doze state when the data frame is received by the AP node. Hence, the AP node cannot immediately transmit the data frame to the client node over the direct link because the client node may not be in an awake mode to receive the transmitted data frame.

In block 520, an indication frame is formed at the AP node for the client node, when no service period has occurred for the client node for a period of time at least equal to an indication window. The indication frame may be referred to as a peer traffic indication frame. An exemplary indication frame may include some or all of the information shown below in Table 2.

TABLE 2

Exemplary Indication Frame Fields

| Order | Fields | Notes |
|-------|--------|-------|
| 1 | Link Identifier | The Link Identifier identifies the direct link |
| 2 | AC_VO backlogged | 1 octet field that indicates if AC_VO is backlogged (1) or not (0) |
| 3 | AC_VI backlogged | 1 octet field that indicates if AC_VI is backlogged (1) or not (0) |
| 4 | AC_BE backlogged | 1 octet field that indicates if AC_BE is backlogged (1) or not (0) |
| 5 | AC_BK backlogged | 1 octet field that indicates if AC_BK is backlogged (1) or not (0) |

The link identifier field of the exemplary indication frame in Table 2 identifies a direct link through the AP node MAC address, the client node MAC address, and the basic service set identifier (BSSID), which is the access point MAC address. The access category (AC) backlogged fields in Table 2 in the indication frame indicate whether a corresponding AC is backlogged for the client node. For example, as illustrated in Table 2, AC backlogged fields for AC_VO, AC_VI, AC_BE, and AC_BK may be present. AC_VO is the access category for voice type traffic; AC_VI is the access category for video type traffic; AC_BE is the access category for best effort type traffic; and AC_BK is the access category for background type traffic.

In block 530, the formed indication frame is sent from the AP node to the client node through an access point. The AP node stays in the awake state after the formed indication frame is sent. In block 540, the indication frame is received at the client node, from the access point. In block 550, whether the AP node has traffic to send to the client node is determined at the client node. The determination is made based on the received indication frame. For example, the client node may determine whether any of the AC Backlogged fields includes a non-zero value. In block 560, a service period is started by the client node by sending a trigger frame from the client node to the AP node over a direct link responsive to a determination by the client node that the AP node has traffic to send to the client node. The trigger frame starts a service period.

Figure 6:
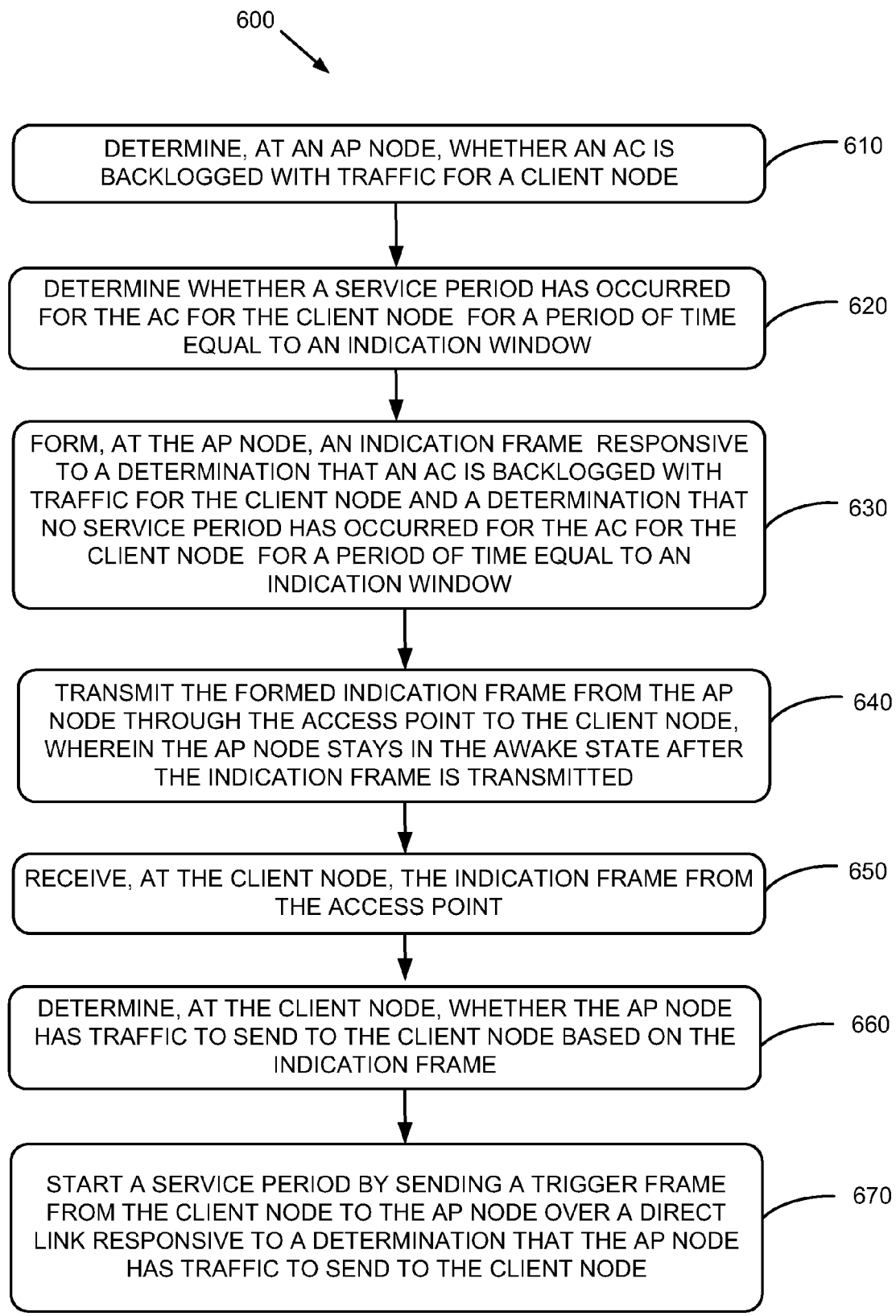

FIG. 6 is a flow chart that illustrates a second embodiment of a method of saving power for stations configured to communicate via a direct link. In FIG. 6, the method 600 includes blocks 610, 620, 630, 640, 650, 660 and 670. In block 610, whether an AC is backlogged with traffic for the client node is determined at an AP node.

In block 620, whether a service period has occurred for the AC for the client node for a period of time at least equal to an indication window is determined. In block 630, an indication frame is formed at the AP node responsive to a determination that an AC is backlogged with traffic for the client node and a determination that no service period has occurred for the AC for the client node for a period of time at least equal to the indication window. The formation of the indication frame in block 630 is similar to the formation of the indication frame described with respect to block 520 above.

In block 640, the formed indication frame is transmitted from the AP node through the access point to the client node. The AP node stays in the awake state after the indication frame is transmitted. In block 650, the indication frame is received at the client node from the access point. In block 660, whether the AP node has traffic to send to the client node is determined at the client node based on the indication frame. In block 670, a service period is started by the client node by sending a trigger frame from the client node to the AP node over a direct link responsive to a determination that the AP node has traffic to send to the client node.

The duration of the indication window is defined such that it is not too long to cause unwanted latency for buffered traffic and not too short to generate too many indication frames. In some embodiments, the duration of the indication window is fixed. For example, the indication window may be 200 ms. In some embodiments, the duration of the indication window is adjustable. For example, the duration of the indication window may be increased if the arrival time of frames at the client node exceeds the indication window. Also, the duration of the indication window may be decreased if the arrival time of frames is less than the indication window. Further, the duration of the indication window may be negotiable by the client node and the AP node.

Figure 7:
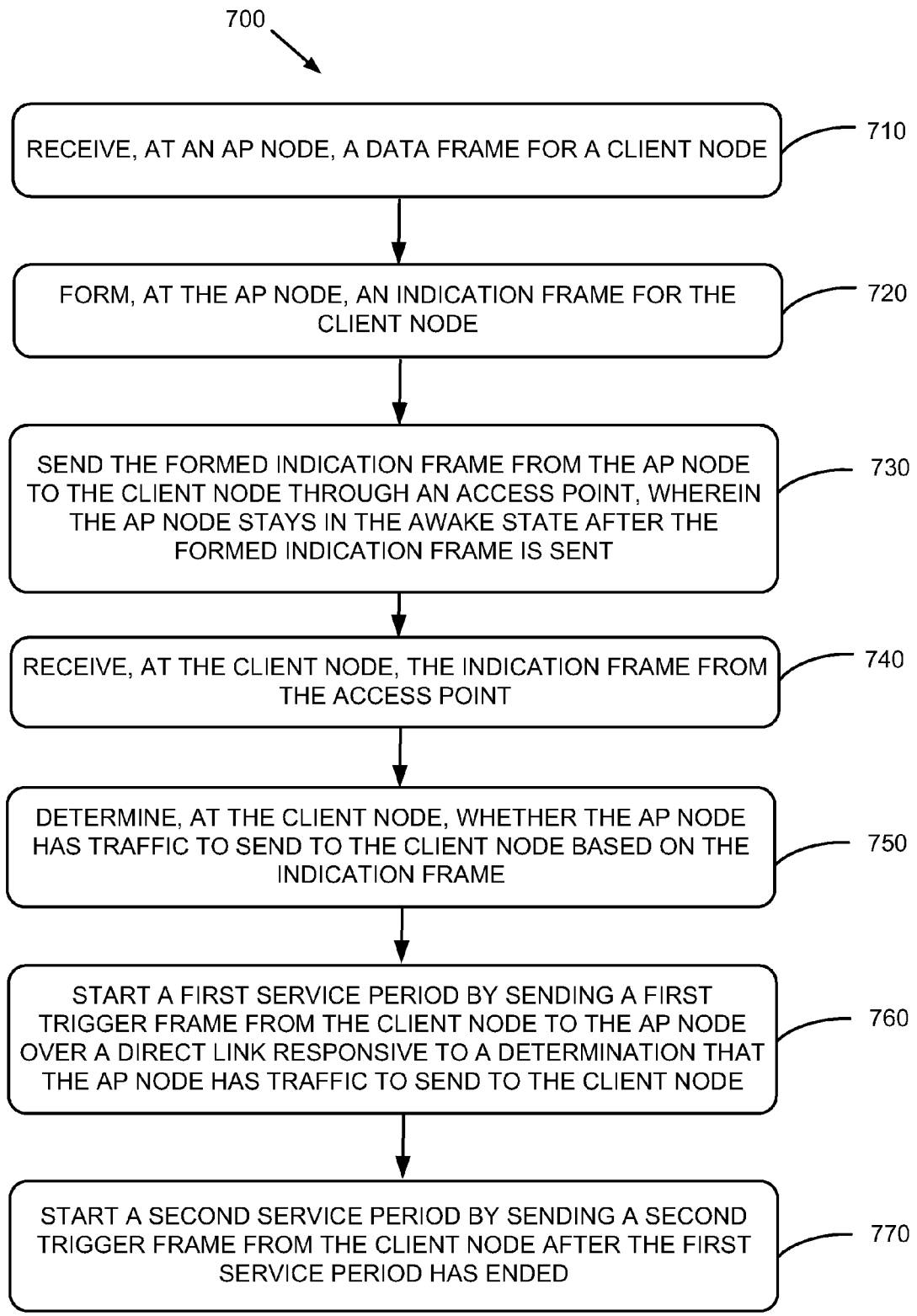

FIG. 7 is a flow chart that illustrates a third embodiment of a method of saving power for stations configured to communicate via a direct link. In FIG. 7, the method 700 includes blocks 710, 720, 730, 740, 750, 760 and 770. In block 710, a data frame for the client node is received at an AP node. The AP node and the client node are stations that are associated with the same access point. The AP node and the client node are direct link peers of each other.

In block 720, an indication frame is formed at the AP node for the client node, upon a determination by the AP node that no service period has occurred for the client node for a period of time at least equal to an indication window. The formation of the indication frame in block 720 is similar to the formation of the indication frame described with respect to block 520 above. In block 730, the formed indication frame is sent from the AP node to the client node through the access point, and the AP node stays in the awake state after the formed indication frame is sent. The AP node stays awake at least until a service period is started by the client node. In block 740, the indication frame is received at the client node from the access point. In block 750, whether the AP node has traffic to send to the client node is determined at the client node based on the indication frame. In block 760, a first service period is started by sending a first trigger frame from the client node to the AP node over a direct link responsive to a determination that the AP node has traffic to send to the client node.

In block 770, a second service period is started by a second trigger frame being sent from the client node after the first service period has ended but before the expiry of a time period at least equal to an indication window. The time period may be measured from the start or the end of the first service period. For example, the final frame of the first service period may include an EOSP bit set to indicate that the first service period is ending and that the AP node will no longer be sending data frames for the first service period to the client node. The QoS Control field, depicted in the MAC header illustrated in FIG. 3, includes an EOSP field that can be used to indicate to a client node that no further data will be transmitted to that client node and that a service period is terminated, for instance because no further data is buffered for that client node. The QoS Control field is described in Table 3 below. For QoS Data and QoS Null frames, the EOSP field is present as bit 4 of the QoS Control field.

TABLE 3

| | | QoS Control field | | | |
|---|---|---|---|---|---|
| Applicable Frame (sub) Types | Bits 0-3 | Bit 4 | Bits 5-6 | Bit 7 | Bits 8-15 |
| QoS Data and QoS Null frames sent over the direct link | TID | EOSP | Ack Policy | Reserved | Reserved |

The rules governing the service period may be the same as those defined in subclause 11.2.1.4 of IEEE Std 802.11™-2007 or in subclause 3.6 of WMM™ (including WMM™ Power Save) Specification version 1.1.

After the frame including the EOSP bit set to indicate that the first service period is ending is received, a second service period is started by a second trigger frame being sent from the client node to the AP node over the direct link. In some embodiments, the client node ensures that a new (e.g., second) service period is started before an indication window expires, to avoid repeated transmission of indication frames. In other words, the new service period is started before a second indication frame is received.

The duration of the indication window is defined such that it is not too long to cause unwanted latency for buffered traffic and not too short to generate too many indication frames or service periods. In some embodiments, the duration of the indication window is fixed. For example, the indication window may be 200 ms. In some embodiments, the duration of the indication window is adjustable. For example, the duration of the indication window may be increased if the arrival time of frames at the client node exceeds the indication window. Also, the duration of the indication window may be decreased if the arrival time of frames is less than the indication window. Further, the duration of the indication window may be negotiable.

Figure 8:
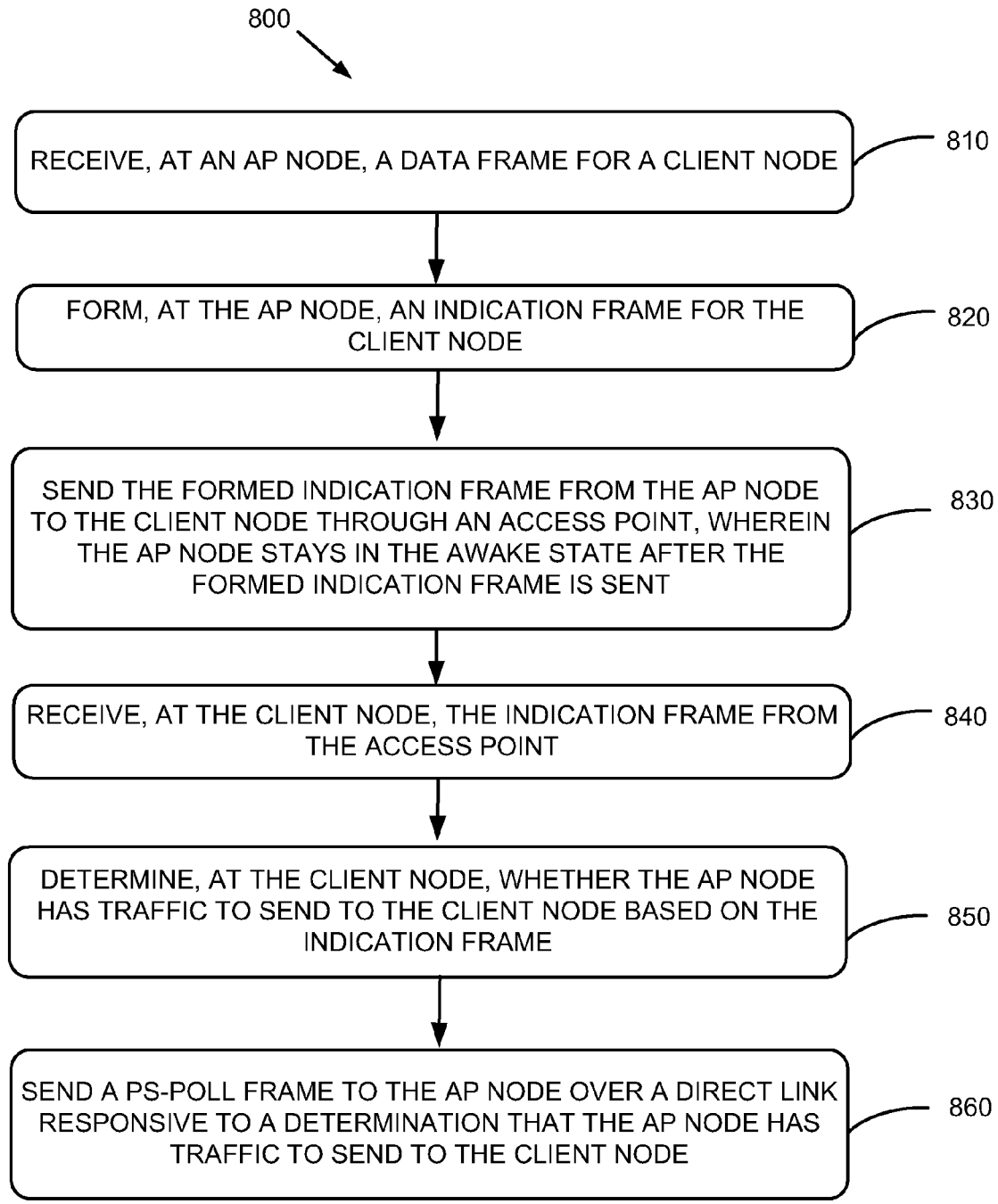

FIG. 8 is a flow chart that illustrates a fourth embodiment of a method of saving power for stations configured to communicate via a direct link. In FIG. 8, the method 800 includes blocks 810, 820, 830, 840, 850, and 860. In block 810, a data frame for the client node is received at an AP node. The AP node and the client node are stations that are associated with the same access point. The AP node and the client node are direct link peers.

In block 820, an indication frame is formed at the AP node for the client node, when no service period has occurred for the client node for a period of time at least equal to the indication window. The formation of the indication frame in block 820 is similar to the formation of the indication frame described with respect to block 520 above. In block 830, the indication frame is sent from the AP node to the client node through an access point, and the AP node stays in the awake state after the formed indication frame is sent, at least until a trigger frame or a PS-Poll frame is received by the AP node from the client node. In block 840, the indication frame is received at the client node from the access point. In block 850, whether the AP node has traffic to send to the client node based on the indication frame is determined at the client node. In block 860, a PS-Poll frame is sent to the AP node responsive to a determination, at the client node, that the AP node has traffic to send to the client node. The PS-Poll frame is sent by the client node in order to receive the buffered traffic from the AP node. After transmitting the PS-Poll frame, the client node remains in the awake state until a frame is received from the AP node, via the direct link.

Figure 9:
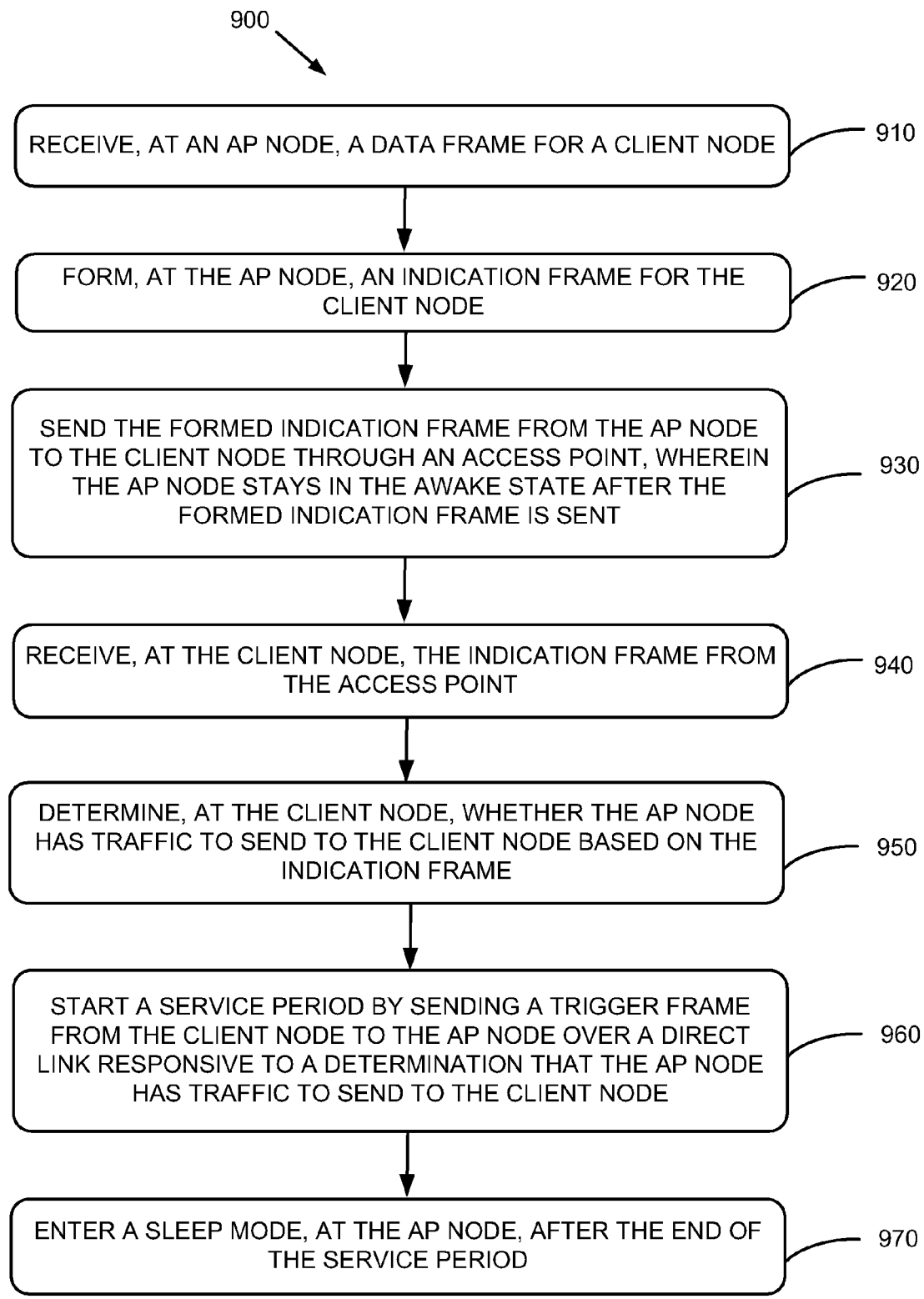

FIG. 9 is a flow chart that illustrates a fifth embodiment of a method of saving power for stations configured to communicate via a direct link. In FIG. 9, the method 900 includes blocks 910, 920, 930, 940, 950, 960, and 970. In block 910, a data frame for the client node is received at an AP node. The AP node and the client node are stations that are associated with the same access point. The AP node and the client node are peers of each other.

In block 920, an indication frame is formed at the AP node for the client node. The formation of the indication frame in block 920 is similar to the formation of the indication frame described with respect to block 520 above. In block 930, the formed indication frame is sent from the AP node to the client node through an access point. The AP node stays in the awake state after the formed indication frame is sent. In block 940, the indication frame is received at the client node from the access point.

In block 950, whether the AP node has traffic to send to the client node is determined at the client node based on the indication frame. For example, the client node may determine whether any of the AC backlogged fields is set to a non-zero value. In block 960, a service period is started by a trigger frame being sent from the client node to the AP node over a direct link responsive to a determination that the AP node has traffic to send to the client node. In block 970, the AP node enters a sleep mode after the end of the service period.

Figure 10:
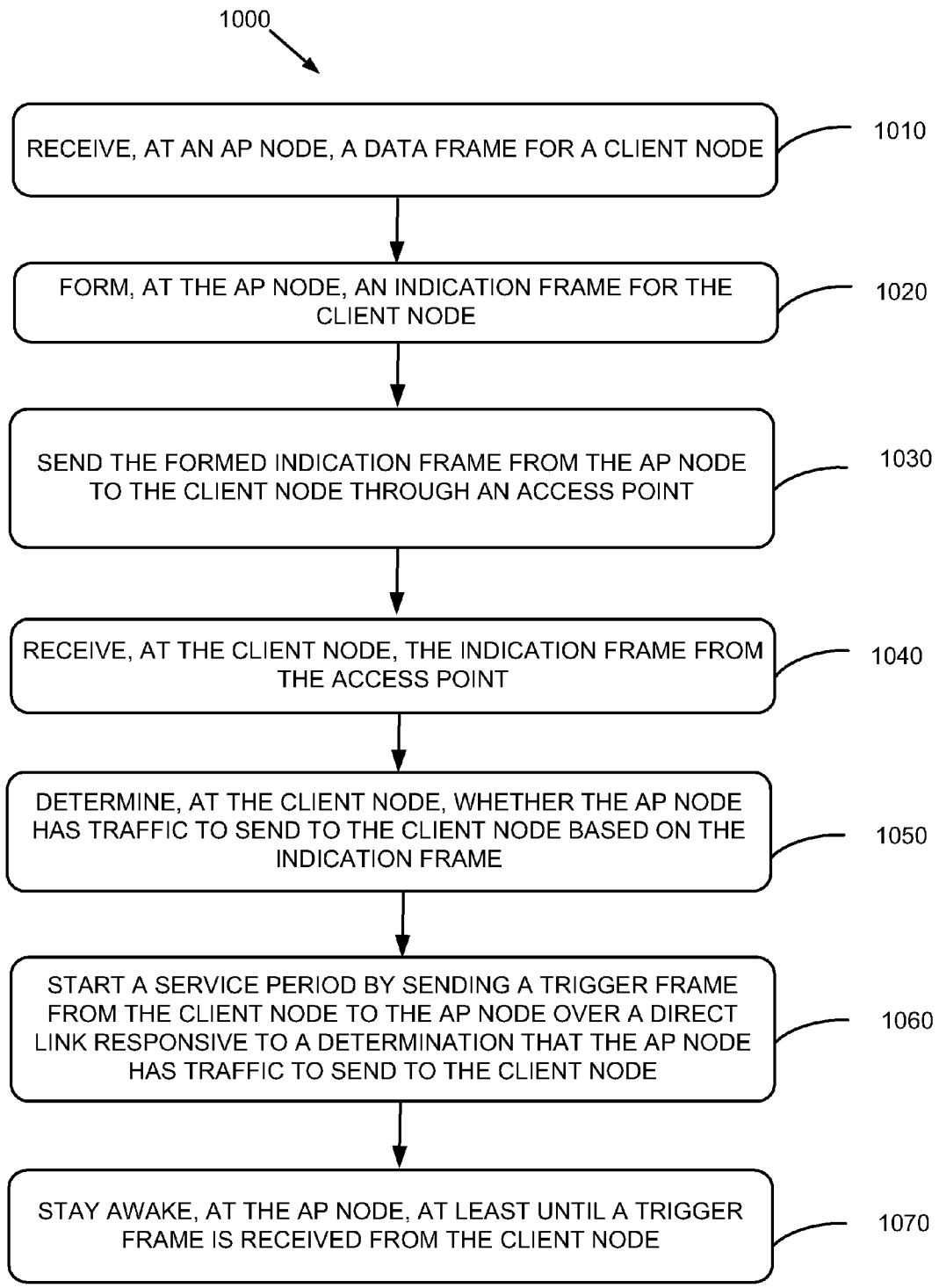

FIG. 10 is a flow chart that illustrates a sixth embodiment of a method of saving power for stations configured to communicate via a direct link. In FIG. 10, the method 1000 includes blocks 1010, 1020, 1030, 1040, 1050, 1060, and 1070. In block 1010, a data frame for the client node is received at an AP node. The AP node and the client node are stations that are associated with the same access point. The AP node and the client node are peers on a direct link. In block 1020, an indication frame is formed at the AP node for the client node. The formation of the indication frame in block 1020 is similar to the formation of the indication frame described with respect to block 520 above. The formation is triggered by the received data for the client node and the absence of a service period for the AC and the client node of the received frame for a duration greater than an indication window.

In block 1030, the formed indication frame is sent from the AP node to the client node through an access point. In block 1040, the indication frame is received at the client node from the access point. In block 1050, whether the AP node has traffic to send to the client node is determined at the client node based on the indication frame from the AP node. In block 1060, a service period is started by the client node by sending a trigger frame from the client node to the AP node over a direct link responsive to a determination that the AP node has traffic to send to the client node. In block 1070, the AP node stays awake at least until a trigger frame is received from the client node.

Figure 11:
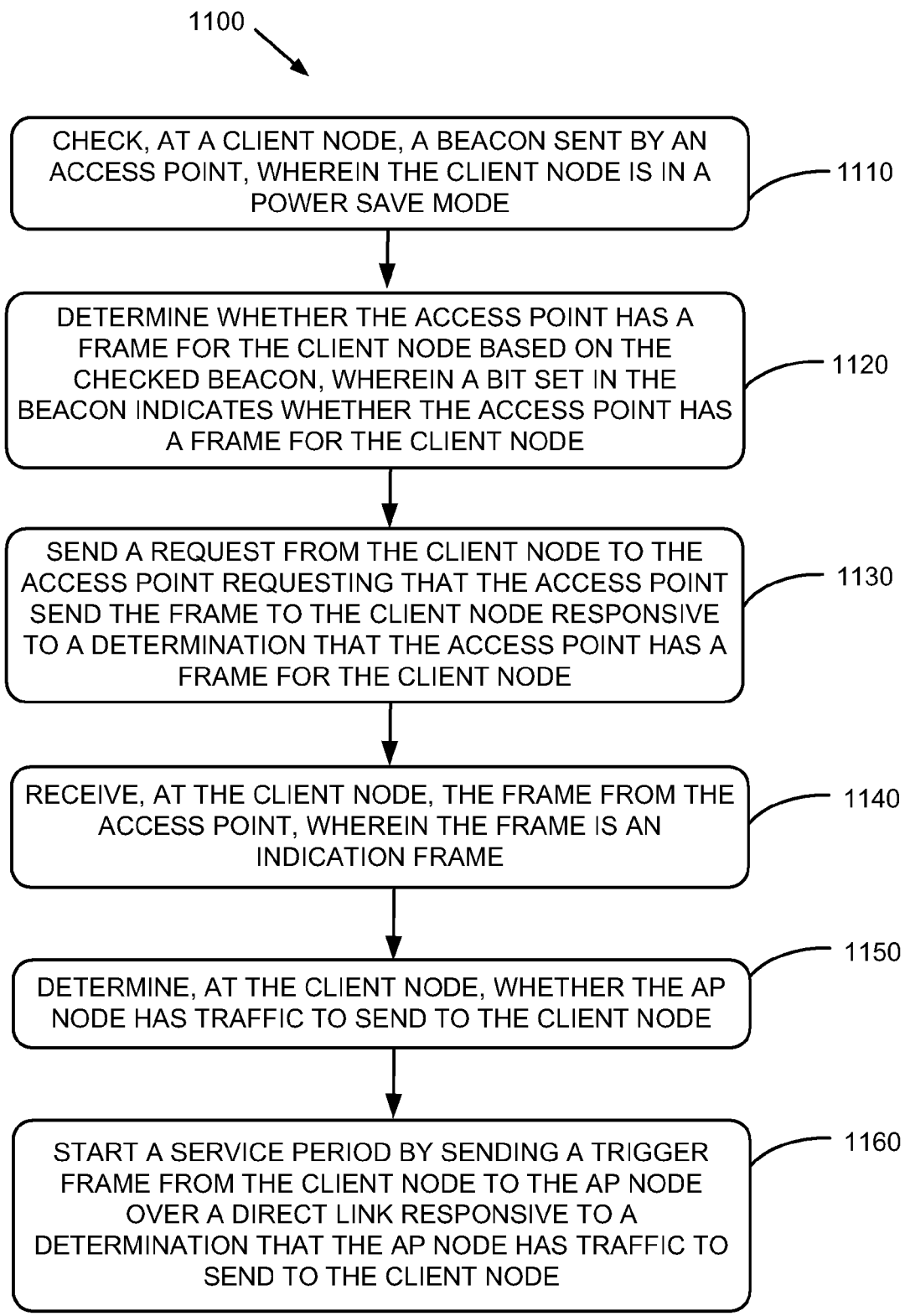

FIG. 11 is a flow chart that illustrates a seventh embodiment of a method of saving power for stations configured to communicate via a direct link. In FIG. 11, the method 1100 includes blocks 1110, 1120, 1130, 1140, 1150, and 1160. In block 1110, a beacon sent by an access point is checked by the client node, and the client node is in a power save mode. In block 1120, whether the access point has a frame for the client node is determined based on the checked beacon. A bit set in the beacon indicates whether the access point has a frame for the client node.

In block 1130, a request is sent from the client node to the access point requesting that the access point send the frame to the client node responsive to a determination that the access point has a frame for the client node. In block 1140, the frame is received at the client node from the access point. The frame is an indication frame. The indication frame is discussed above with respect to Table 2. In block 1150, whether the AP node has traffic to send to the client node is determined at the client node. In block 1160, a service period is started by sending a trigger frame from the client node to the AP node over a direct link responsive to a determination that the AP node has traffic to send to the client node.

Figure 12:
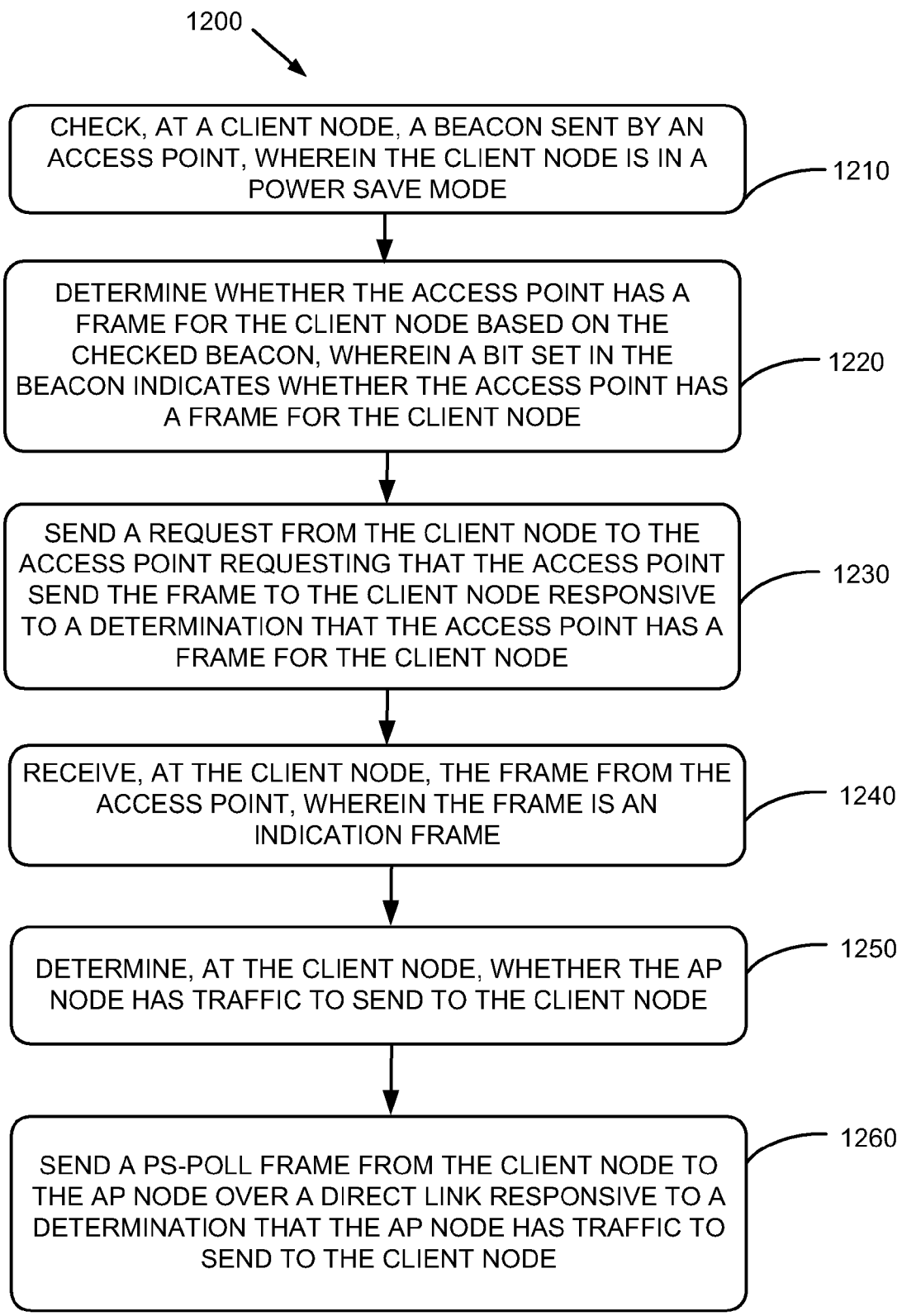

FIG. 12 is a flow chart that illustrates an eighth embodiment of a method of saving power for stations configured to communicate via a direct link. In FIG. 12, the method 1200 includes blocks 1210, 1220, 1230, 1240, 1250, and 1260. In block 1210, a beacon sent by an access point is checked by the client node, and the client node is in a power save mode.

In block 1220, whether the access point has a frame for the client node is determined based on the checked beacon. A bit set in the beacon indicates whether the access point has a frame for the client node. In block 1230, a request is sent from the client node to the access point requesting that the access point send the frame to the client node responsive to a determination that the access point has a frame for the client node.

In block 1240, the frame is received at the client node from the access point. The frame is an indication frame. In block 1250, whether the AP node has traffic to send to the client node is determined at the client node. In block 1260, a PS-Poll frame is sent from the client node to the AP node over a direct link responsive to a determination that the AP node has traffic to send to the client node.

Figure 13:
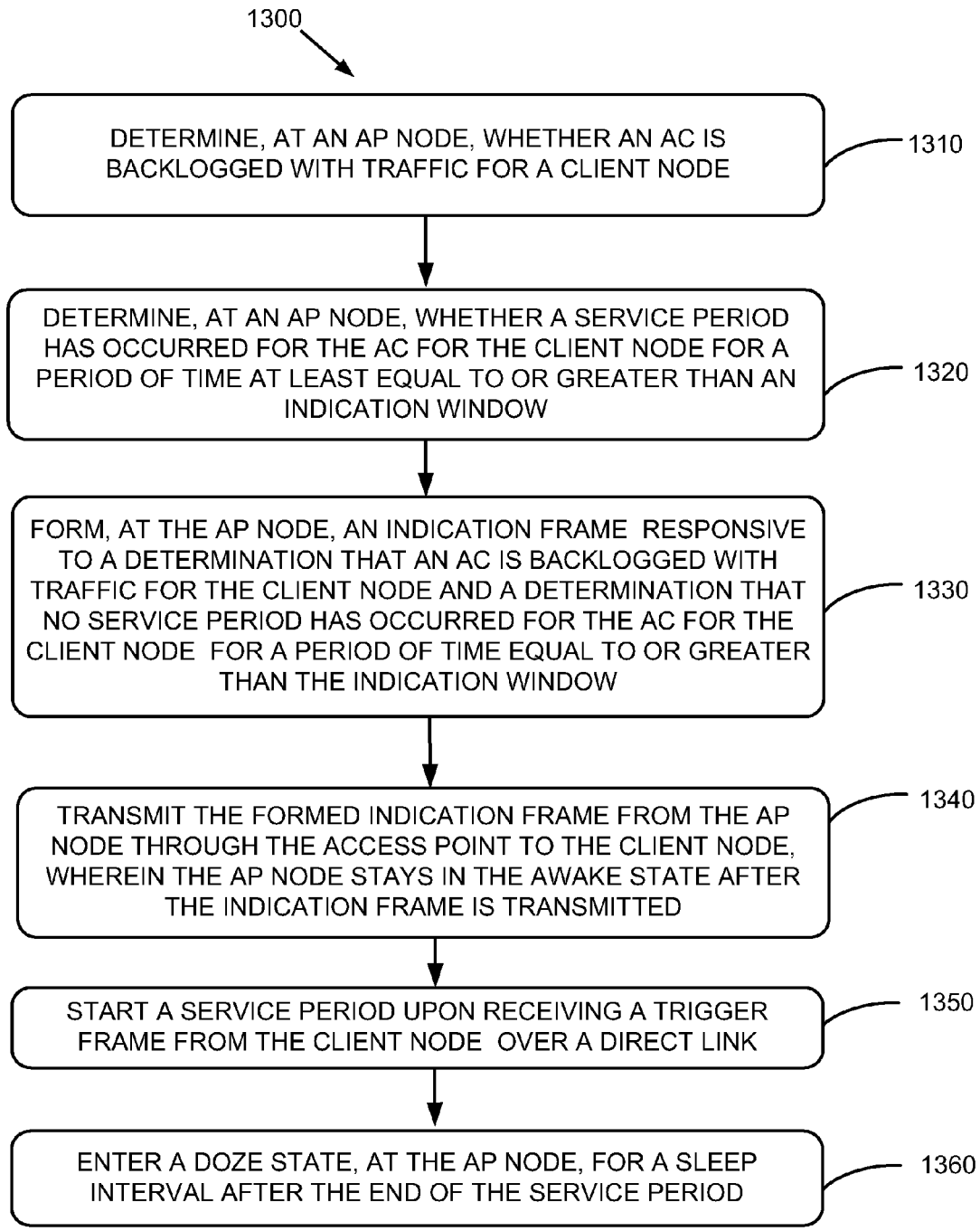

FIG. 13 is a flow chart that illustrates a ninth embodiment of a method of saving power for stations configured to communicate via a direct link. In FIG. 13, the method 1300 includes blocks 1310, 1320, 1330, 1340, 1350, and 1360. In block 1310, whether an AC is backlogged with traffic for a client node is determined at an AP node. In block 1320, whether a service period has occurred for the AC for the client node for a period of time at least equal to an indication window is determined at the AP node.

In block 1330, an indication frame is formed at the AP node responsive to a determination that the AC is backlogged and a determination that no service period has occurred for the AC for the client node for a period of time at least equal to the indication window. The formation of the indication frame in block 1330 is similar to the formation of the indication frame described with respect to block 520 above.

In block 1340, the formed indication frame is transmitted from the AP node through the access point to the client node. The AP node stays in the awake state, after the indication frame is transmitted, at least until a trigger frame is received from the client node. In block 1350, a service period is started upon receiving a trigger frame from the client node. In block 1360, the AP node enters a doze state for a sleep interval after the end of the service period. The transmission of frames between the client node and the AP node may be suspended during the sleep interval. In some embodiments, the duration of the sleep interval is less than the indication window. In some embodiments, the duration of the sleep interval is longer than the indication window. Also, in some embodiments, the duration of the sleep interval is negotiable between the client node and the AP node. Still, in some embodiments, the duration of the sleep interval is dependent upon a service interval from the traffic specification (TSPEC). In some embodiments, the duration of the sleep interval is also determined by the arrival of new traffic for the client node.

In some embodiments, the duration of the indication window is adjustable. For example, the duration of the indication window may be increased if the arrival time of frames at client node exceeds the indication window. Also, the duration of the indication window may be decreased if the arrival time of frames is less than the indication window.

Figure 14:
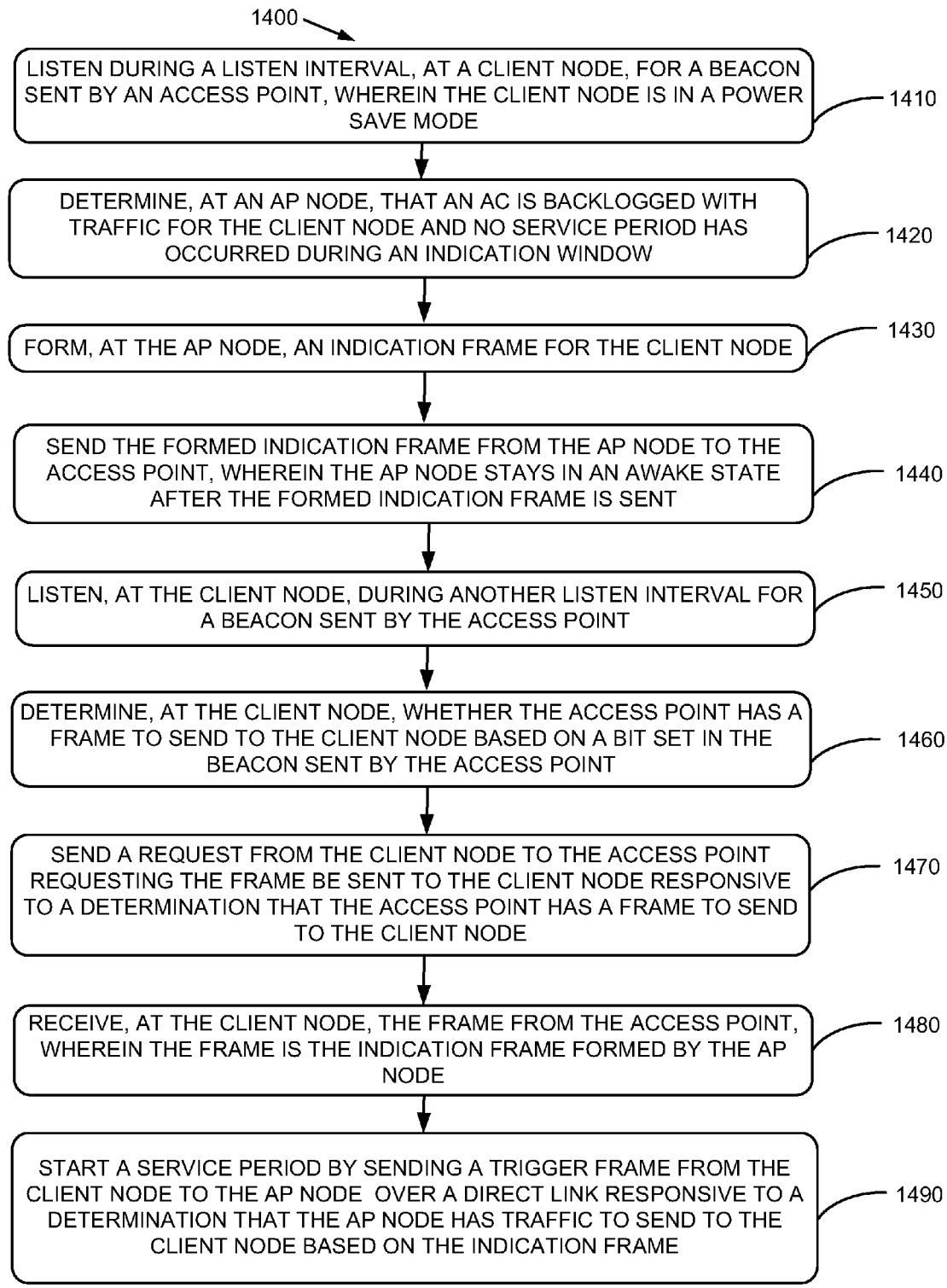

FIG. 14 is a flow chart that illustrates a tenth embodiment of a method of saving power for stations configured to communicate via a direct link. In FIG. 14, the method 1400 includes blocks 1410, 1420, 1430, 1440, 1450, 1460, 1470, 1480, and 1490. In block 1410, a client node listens for a beacon sent by an access point during a listen interval. The client node is in a power save mode. In block 1420, an AP node determines that an AC is backlogged with traffic for the client node and no service period has occurred during an indication window. In block 1430, an indication frame is formed at the AP node for the client node.

In block 1440, the formed indication frame is sent from the AP node to the access point. The AP node stays in an awake state after the formed indication frame is sent. In block 1450, the client node listens during another listen interval for a beacon sent by the access point. In block 1460, whether the access point has a frame to send to the client node based on a bit set in the beacon sent by the access point is determined at the client node. In block 1470, a request is sent from the client node to the access point requesting the frame be sent to the client node responsive to a determination that the access point has a frame to send to the client node.

In bock 1480, the frame from the access point is received at the client node. The frame is an indication frame formed by the AP node. In block 1490, a service period is started by sending a trigger frame from the client node to the AP node over a direct link responsive to a determination that the AP node has traffic to send to the client node based on the indication frame.

Figure 4:
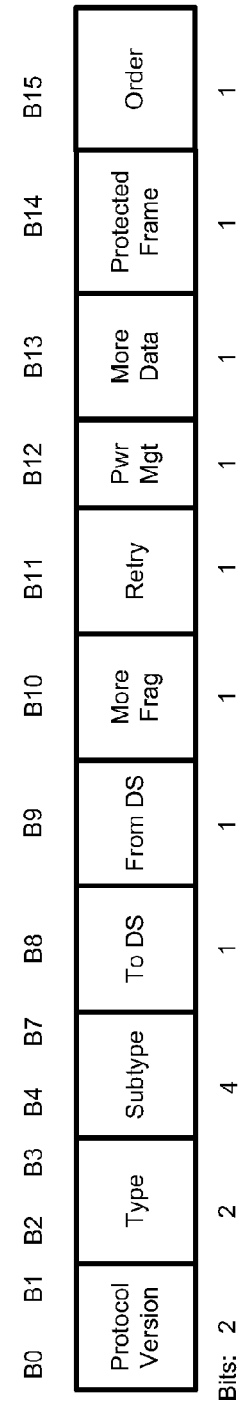
FIG. 4 is a schematic diagram of a frame control field of the general MAC frame format defined in IEEE 802.11 and depicted in FIG. 3.
Figure 15:
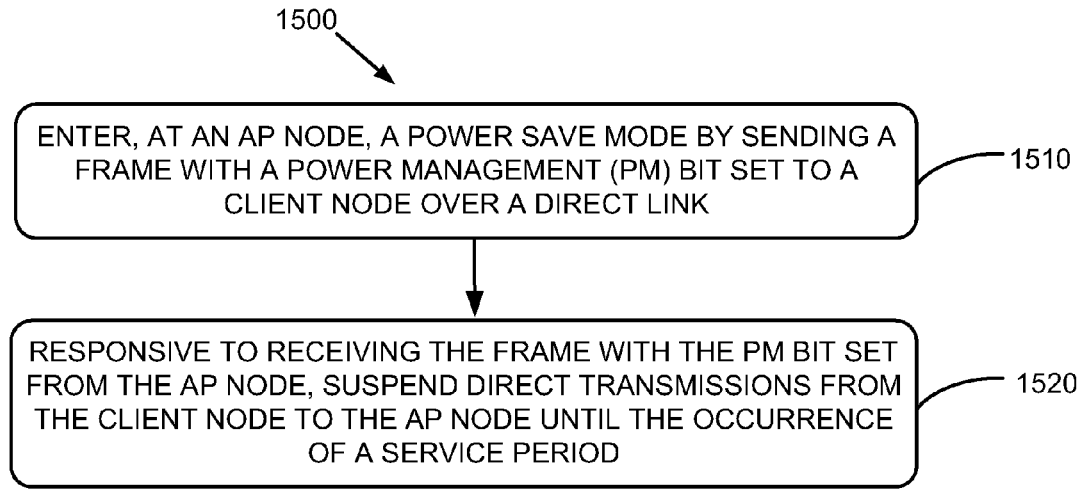

FIG. 15 is a flow chart that illustrates an eleventh embodiment of a method of saving power for stations configured to communicate via a direct link. In FIG. 15, the method 1500 includes blocks 1510 and 1520. In block 1510, an AP node enters power save by sending a frame with the power management (PM) bit set to a client node over a direct link. The PM field, which includes the PM bit, is 1 bit in length and indicates the PM mode of the station. The PM field is included in the frame control field of the MAC header, as illustrated in FIG. 4. A value of 1 indicates that the AP node will be in a power save mode. A value of 0 indicates that the AP node will be in active (constantly awake) mode. The frame including the PM bit set in block 1510 includes the PM bit set to 1, to indicate that the AP node will be in a power save mode.

In block 1520, responsive to receiving the frame with the PM bit set from the AP node, the client node suspends direct transmissions to the AP node, until the occurrence of a service period. The service period may be triggered by the transmission of an indication frame by the client node.

Figure 16:
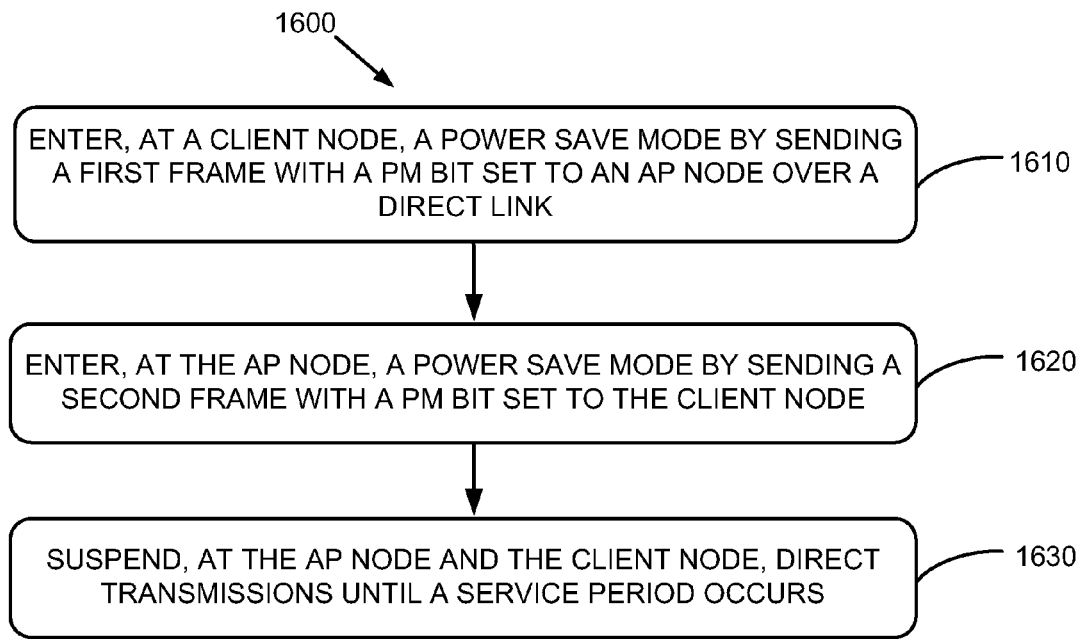

FIG. 16 is a flow chart that illustrates a twelfth embodiment of a method of saving power for stations configured to communicate via a direct link. In FIG. 16, the method 1600 includes blocks 1610, 1620 and 1630. In block 1610, a client node enters power save mode by sending a first frame with the PM bit set to an AP node over a direct link. The first frame including the power management bit set in block 1610 includes the power management bit set to 1, to indicate that the client node will be in a power save mode.

In block 1620, the AP node enters a power save mode by sending a second frame with the PM bit set to the client node. A value of 1 indicates that the AP node will be in a power save mode. A value of 0 indicates that the AP node will be in active (constantly awake) mode. The second frame including the power management bit set in block 1620 includes the power management bit set to 1, to indicate that the AP node will be in a power save mode. The second frame is transmitted during a service period that is initiated by the client node.

In block 1630, the AP node and the client node suspend direct transmissions until a service period occurs. The service period may be triggered by the transmission of an indication frame.

In the various embodiments discussed above with respect to FIGS. 5-16, traffic for an AC may be routed over the direct link while traffic for another AC may be routed through the access point. If an AC carries traffic that has high duty cycle relative to the traffic routed through another AC, it may be useful to route the traffic having the higher duty cycle over the direct link while the traffic having the lower duty cycle is routed through the access point. Video (VI) and voice (VO) traffic may have a high duty cycle relative to background (BK) and best effort (BE), and traffic for AC_VI and AC_VO is routed through the direct link while traffic for AC_BK and AC_BE is routed through the access point.

Any process descriptions or blocks in flow diagrams shown in FIGS. 5-16 should be understood as representing modules, segments, or portions of code which include one or more executable instructions for implementing specific logical functions or steps in the process, and alternate implementations are included within the scope of the embodiments described herein in which functions may be executed out of order from that shown or discussed, including substantially concurrently or in reverse order, depending on the functionality involved, as would be understood by those reasonably skilled in the art. Additionally, the methods illustrated in the flow charts of FIGS. 5-16 are not limited to the system embodiments shown in FIGS. 1 and 2, but may be extended to other architectures and systems as should be appreciated by one having ordinary skill in the art in the context of this disclosure.

It should be emphasized that the above-described embodiments are merely possible examples of implementations, merely set forth for a clear understanding of the principles of the disclosure. Many variations and modifications may be made to the above-described embodiment(s) without departing substantially from the scope of the disclosure. All such modifications and variations are intended to be included herein within the scope of this disclosure.

At least the following is claimed:

1. A method, comprising:
   sending, by a first station, an indication frame to a second station, when the first station has traffic buffered for the second station and when no service period has occurred between the first station and the second station for a period of time at least equal to an indication window, wherein a service period comprises a time period during which buffered data is delivered by the first station to the second station, wherein an end of the service period is indicated by an end of service period (EOSP) frame transmitted by the first station to the second station, the indication window comprising a requisite period of time to elapse before enabling transmission of an indication frame, the second station operating as a client node relative to the first station, the first and second stations comprising direct link peers that share an access point, the second station having entered a power save mode on the direct link, the indication frame sent as a unicast transmission from the first station to the second station through the access point;
   receiving, at the second station, the indication frame from the access point; and
   determining, at the second station, that the first station has traffic to send to the second station based on the indication frame, the indication frame indicating to the second station the presence of the traffic at the first station.

2. The method of claim 1, wherein the traffic for the second station and the service period correspond to an access category; and
   wherein the indication frame indicates to the second station the presence of the traffic at the first station for the access category.

3. The method of claim 1, wherein the buffered traffic comprises one or more data frames at the first station destined for the second station.

4. The method of claim 1, further comprising starting a first service period by sending a first trigger frame from the second station to the first station over a direct link.

5. The method of claim 4, further comprising starting a second service period by sending a second trigger frame from the second station to the first station over the direct link after the first service period has ended.

6. The method of claim 5, wherein the starting of the second service period is before an indication window has expired.

7. The method of claim 1, further comprising sending a power save poll (PS-Poll) frame from the second station to the first station over a direct link.

8. The method of claim 7, further comprising sending the PS-Poll frame before an indication window has expired.

9. The method of claim 1, further comprising configuring a direct link between the first and second stations according to a tunneled direct link setup (TDLS).

10. The method of claim 1, wherein the first station enters a power save mode on the direct link, and wherein after sending the indication frame, the first station stays awake at least until a trigger frame is received from the second station.

11. The method of claim 10, wherein the first station enters a doze state after the end of a service period.

12. The method of claim 1, wherein the first station enters a wake mode when sending the formed indication frame.

13. The method of claim 1, wherein the first station stays awake at least until a PS-Poll frame is received from the second station.

14. A first station, comprising:
    a processor; and
    a memory component that stores executable instructions that are executable by the processor, the processor being configured by the executable instructions to:
      determine whether an access category (AC) contains traffic for a second station, the second station operating as a client node relative to the first station, the first and second stations comprising direct link peers that share an access point, the second station having entered a power save mode on the direct link;
      determine whether a service period has occurred between the first station and the second station for the AC for the second station for a period of time equal to or greater than an indication window, wherein a service period comprises a time period during which buffered data is delivered by the first station to the second station, wherein an end of the service period is indicated by an end of service period (EOSP) frame transmitted by the first station to the second station, the indication window comprising a requisite period of time to elapse before enabling transmission of an indication frame; and
      cause a unicast transmission of an indication frame to the second station through the access point responsive to a determination that the AC contains traffic for the second station and a determination that no service period has occurred for the AC for the second station for a period of time equal to or greater than the indication window, the indication frame indicating to the second station the presence of the traffic at the first station.

15. The first station of claim 14, wherein the processor is further configured by the executable instructions to cause transmission of a buffered frame to the second station upon receipt of a trigger frame from the second station.

16. The first station of claim 15, wherein the AC contains traffic including one or more buffered frames destined for the second station, wherein the buffered frame is one of the one or more buffered frames.

17. The first station of claim 14, wherein the processor is further configured by the executable instructions to cause the first station to enter a doze state for a sleep interval after the end of the service period.

18. The device of claim 14, wherein the processor is further configured by the executable instructions to cause transmission of the indication frame to the second station via the access point.

19. A method, comprising:
- determining at a first station whether an access category (AC) contains traffic for a second station;
- determining whether a service period has occurred between the first station and the second station for the AC for the second station for a period of time equal to or greater than an indication window, wherein a service period comprises a time period during which buffered data is delivered by the first station to the second station, wherein an end of the service period is indicated by an end of service period (EOSP) frame transmitted by the first station to the second station, the indication window comprising a requisite period of time to elapse before enabling transmission of an indication frame, the second station operating as a client node relative to the first station, the first and second stations comprising direct link peers that share an access point, the second station having entered a power save mode on the direct link;
- sending an indication frame responsive to a determination that the AC contains traffic for the second station and a determination that no service period has occurred for the AC for the second station for a period of time equal to or greater than the indication window, the indication frame sent as a unicast transmission from the first station to the second station through the access point, the indication frame indicating to the second station the presence of the traffic for the AC at the first station.

* * * * *